(12) United States Patent  (10) Patent No.: US 6,709,147 B1
Rauwendaal  (45) Date of Patent: Mar. 23, 2004

(54) INTERMESHING ELEMENT MIXER

(75) Inventor: Chris J. Rauwendaal, Los Altos Hills, CA (US)

(73) Assignee: Rauwendaal Extrusion Engineering, Inc., Los Altos Hills, CA (US)

( * ) Notice: Subject to any disclaimer, the term of this patent is extended or adjusted under 35 U.S.C. 154(b) by 2 days.

(21) Appl. No.: 10/310,492

(22) Filed: Dec. 5, 2002

(51) Int. Cl.$^7$ ............................... B29B 7/42; B29B 7/74
(52) U.S. Cl. ........................................... 366/80; 366/81
(58) Field of Search ...................... 366/79–82; 425/204, 425/208, 209

(56) References Cited

U.S. PATENT DOCUMENTS

| 3,583,684 | A | * | 6/1971 | Schippers |
| 4,070,138 | A | | 1/1978 | Stanwood |
| 4,112,516 | A | | 9/1978 | Hotz |
| 4,332,482 | A | | 6/1982 | Engler |
| 4,387,997 | A | | 6/1983 | Klein et al. |
| 4,453,905 | A | | 6/1984 | Bennett |
| 4,779,989 | A | * | 10/1988 | Barr |
| 5,013,233 | A | | 5/1991 | Semmekrot |
| 5,112,213 | A | | 5/1992 | Oas |
| 5,114,658 | A | | 5/1992 | Katsaros |
| 5,130,076 | A | | 7/1992 | Blatz et al. |
| 5,158,784 | A | | 10/1992 | Semmekrot |
| 5,240,398 | A | | 8/1993 | Akaguma et al. |
| 5,501,519 | A | * | 3/1996 | Miyauchi et al. |
| 5,573,331 | A | | 11/1996 | Lin |
| 5,988,866 | A | | 11/1999 | Barr |
| 6,062,717 | A | * | 5/2000 | Schirmer |
| 6,224,812 | B1 | | 5/2001 | Allan et al. |
| 6,254,266 | B1 | | 7/2001 | Barr et al. |
| 6,299,342 | B2 | | 10/2001 | Eggen et al. |
| 6,305,831 | B1 | | 10/2001 | Gathmann et al. |
| 6,345,907 | B1 | | 2/2002 | Akay et al. |
| 6,454,454 | B1 | * | 9/2002 | Barr |
| 2001/0038571 | A1 | * | 11/2001 | Florian |

FOREIGN PATENT DOCUMENTS

EP 00048590 B1 7/1983
JP 62-171745 * 7/1987

* cited by examiner

Primary Examiner—Charles E. Cooley
(74) Attorney, Agent, or Firm—Larry B. Guernsey; IPLO Intellectual Property Law Offices

(57) ABSTRACT

A mixing section (10,50,60) for mixing material in an extruder (8) having a barrel (32), The mixing section (10, 50,60) includes a screw (14) having a central shaft (16), and a floating annular sleeve (12) located between the screw (14) and the barrel (32), and surrounding a portion of the screw (14). The sleeve (12) has mixing elements (28) protruding radially inward toward the screw (14). A portion of the central shaft (16) has mixing elements (18) protruding radially outward toward the sleeve (12). The mixing elements (18) on the screw (14) and the sleeve (12) create multiple regions of reorientation (2) in the material to be mixed which produce improved dispersive mixing.

16 Claims, 7 Drawing Sheets

INTERMESHING ELEMENT MIXER

TECHNICAL FIELD

The present invention relates generally to machines for extrusion of materials and more particularly to screw extruders adapted for use with plastics and plastic-like materials. The inventor anticipates that primary application of the present invention will be for the manufacture of color concentrates, polymer blends, and polymer alloys or articles produced by mixing polymers with concentrates, fillers, other polymers, additives, and the like.

BACKGROUND ART

A screw extruder is a machine in which material, usually some form of plastic, is forced under pressure to flow through a contoured orifice in order to shape the material. Injection molding machines utilize extruders to force materials under pressure into a mold cavity. Screw extruders are generally composed of a housing, which is usually a cylindrical barrel section, surrounding a central motor-driven screw. At a first end of the barrel is a feed housing containing a feed opening through which new material, usually plastic particles, is introduced into the barrel. The screw contains raised portions called flights having a larger radial diameter than the screw's central shaft and which are usually wrapped in a helical manner about the central shaft. The material is then conveyed by these screw flights toward the second end of the barrel through a melting zone, where the material is heated under carefully controlled conditions to melt the material, and then passes through a melt-conveying zone, also called a pumping zone. The melted plastic is finally pressed through a shaped opening or die to form the extrudate.

Besides conveying material toward the die for extrusion, the screw is depended upon to perform mixing of the feed material. Very generally, mixing can be defined as a process to reduce the non-uniformity of a composition. The basic mechanism involved is to induce relative physical motion in the ingredients. The two types of mixing that are important in screw extruder operation are distribution and dispersion. Distributive mixing is used for the purpose of increasing the randomness of the spatial distribution of the particles without reducing the size of these particles. Dispersive mixing refers to processes that reduce the size of cohesive particles as well as randomizing their positions. In dispersive mixing, solid components, such as agglomerates, or high viscosity droplets are exposed to sufficiently high stresses to cause them to exceed their yield stress, and they are thus broken down into smaller particles. The size and shape of the agglomerates and the nature of the bonds holding the agglomerate together will determine the amount of stress required to break up the agglomerates. The applied stress can either be shear stress or elongational stress and generally, elongational stress is more efficient in achieving dispersion than is shear stress. An example of dispersive mixing is the manufacture of a color concentrate where the breakdown of pigment agglomerates below a certain critical size is crucial. An example of distributive mixing is the manufacture of miscible polymer blends, where the viscosities of the components are reasonably close together. Thus, in dispersive mixing, there will always be distributive mixing, but distributive mixing will not always produce dispersive mixing.

In some extrusion processes, the need for good dispersive mixing is more important than for distributive mixing. This is particularly true in the extrusion of compounds which contain pigment agglomerate that must be reduced in size.

In screw extruders, significant mixing occurs only after the polymer has melted. Thus, the mixing zone is thought of as extending from the start of the melting zone to the end of the extrusion die. Within this area there will be considerable non-uniformities in the intensity of the mixing action and the duration of the mixing action, both in the barrel section and in the extrusion die. In molten polymer, the stress is determined by the product of the polymer melt viscosity and rate of deformation. Therefore, in general, dispersive mixing should be done at as low a temperature as possible to increase the viscosity of the fluid, and with it, the stresses in the polymer melt.

Fluid elements are spoken of as having a "mixing history", which refers to the amount of elongational and shear stress to which it has been exposed, and the duration of that exposure. A polymer element that melts early in the melting zone process will have a more significant mixing history than one that melts near the end of the melting zone.

Generally, in an extruder with a simple conveying screw the level of stress or fraction of the fluid exposed to high stresses is not high enough to achieve good dispersive mixing. Distributive mixing is easier to achieve than dispersive mixing, but unmodified screws have also been found to produce inadequate distributive mixing for many applications. Therefore, numerous variations in screw design have been attempted in prior inventions to increase the amount of distributive or dispersive mixing in screw extruders. These devices usually contain a standard screw section near the material input hopper, and one or more specially designed sections to enhance mixing. These mixing sections naturally fall into the categories of distributive and dispersive mixing elements although some mixing devices achieve both distributive and dispersive mixing.

Prior mixers that have attempted to improve distributive and dispersive mixing are shown in FIGS. 3–6 (prior art). Three mixers, the Cavity Transfer Mixer (CTM), the Twente Mixing Ring (TMR), and the Kneader, are discussed below.

The Cavity Transfer Mixer (CTM)

FIG. 3 (prior art) shows the geometry of the CTM. It consists of a screw extension with hemi-spherical cavities and a barrel extension that also contains hemi-spherical cavities. The screw rotates and the barrel is stationary. The fluid passing through the mixer flows from a screw cavity to a barrel cavity and back to another screw cavity. This action repeats itself several times as the fluid passes through the mixer. The CTM was a significant development because it was able to improve the mixing capability of single screw extruders (SSE) significantly. The reason for the efficiency of the CTM is the multiple reorientation events that occur when the fluid moves from a cavity in the screw to a cavity in the barrel.

The CTM suffers from several practical drawbacks that have limited the commercial success of this mixer. Some of these disadvantages are:

1. The mixing section has no forward pumping capability; as a result, it is a pressure consuming element of the extruder and this will tend to reduce the extruder output and increase the polymer melt temperature.
2. The barrel has hemi-spherical cavities in the CTM section. This means that a separate CTM barrel section has to be installed—this increases the cost of the mixer substantially and also complicates the installation of a CTM.

3. The barrel surface is no longer completely wiped by the screw. Polymer melt will enter the barrel cavities and the polymer melt flow in the bottom of the cavities can be very slow. As a result, when a change in material is made (e.g. from white to red) it can take an inordinately long time for the old material to disappear in the extruded product. Therefore, in many cases the mixer has to be physically cleaned when a material change is made. This cleaning can be quite time consuming and results in lost production. This can be a distinct disadvantage when frequent material changes are made.

The Twente Mixing Ring (TMR)

The TMR (FIG. 4, prior art) was developed at Twente University by Semmekrot. The TMR uses the same principle of mixing as the CTM; however, instead of using cavities in the barrel it uses a floating annular mixing ring or sleeve with holes bored into it. The mixing sleeve rotates with the screw but at a lower rotational speed and this provides the relative velocity between the screw cavities and the sleeve cavities. Thus, the TMR eliminates an important drawback of the CTM, the cavities in the barrel. As a result, the TMR can be used in regular extruders and IMMs without the need to add a separate barrel section with cavities. The TMR is successfully used in a number of injection molding applications where the mixer is incorporated into the non-return valve. Since the typical non-return valve (NRV) is relatively short the mixing action of a mixing action of a mixing NRV has to be very effective to produce a product with good homogeneity.

The Kneader

FIGS. 5–6 (prior art) show the Buss Ko-Kneader. This is a single screw compounding extruder where the screw rotates and reciprocates axially. The barrel of the kneader is equipped with three axial rows of mixing pins and the screw flights have slots machined in them so that the pins move through the slots of the screw flights. This creates a very efficient mixing action that allows the kneader to be much shorter than conventional compounding extruders. The typical length of a kneader is about 11D while the typical length of a twin screw compounder is about 35D–50D. The efficient mixing action of the kneader is created by the barrel pins that cause a much more efficient surface generation than a smooth barrel surface. However, the installation of pins in the inner barrel creates expense, as well as the difficulty of introducing the screw into the barrel without encountering the pins.

U.S. Pat. No. 6,305,831 shows an apparatus for mixing a polymer melt that uses a hollow outer shaft having mixing elements attached to the inner and outer surfaces in conjunction with mixing elements on the inner shaft to mix material. The hollow outer shaft is driven by a gear wheel and is apparently not available to retrofit within regular screw extruders or plasticating units.

For the foregoing reasons, there is a great need for a screw extruder which provides better distributive and dispersive mixing than in presently available extruders, which utilizes a floating ring having mixing elements that interact with mixing elements on the main screw and which can travel at a different velocity than the main screw, and which is retrofitable within standard extruders.

DISCLOSURE OF INVENTION

Accordingly, it is an object of the present invention to provide a mixing section which provides improved mixing.

Another object of the invention is to provide a mixing section which is usable in both screw extruders and injection molding machinery.

And another object of the invention is to provide a mixing section which provides excellent mixing and is simple to manufacture.

A further object of the present invention is to provide a mixing section that is easily retrofitable to many existing types of screw extruder barrels.

An additional object of the present invention is to provide a mixing section which produces a low pressure drop in this mixing section.

Yet another object of the present invention is to provide a mixing section that provides a high number of re-orientation events for the material being processed.

A yet further object of the present invention is to provide a mixing section in which there is good streamlining of material, a large number of divisions per cross-section and the barrel of the extruder is completely wiped.

Briefly, one preferred embodiment of the present invention is a mixing section for mixing material in an extruder having a barrel. The mixing section includes a screw having a central shaft, and a floating annular sleeve located between the screw and the barrel, and surrounding a portion of the screw. The sleeve has mixing elements protruding radially inward toward the screw. A portion of the central shaft has mixing elements protruding radially outward toward the sleeve. The mixing elements on the screw and the annular sleeve create multiple regions of reorientation in the material to be mixed which produce improved distributive mixing.

Also disclosed are an extruder having such a mixing section and a floating sleeve for use in a mixing section.

An advantage of the present invention is that material change-over time between runs of materials of different colors or compositions is very fast.

Another advantage of the present invention is that the present mixing section produces a very high number of re-orientation events, and thus very high quality distributive mixing of materials.

And another advantage of the present invention is that there is very little pressure drop in the mixing section, thus throughput is very high.

A further advantage of the present invention is that the main transfer direction of material is axial, rather than radial, so throughput can be maintained at a high level.

A yet further advantage is that the present mixing section can be retrofitted into existing extruders and injection molding machines at a relatively low cost.

An additional advantage is that because there is such a high concentration of re-orientation events in the mixing section, the overall length of the mixer can be reduced.

A further advantage is that the quality of mixing is so high that it rivals that of multiple screw mixers, which are much more expensive, thus providing cost benefits to manufacturers.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
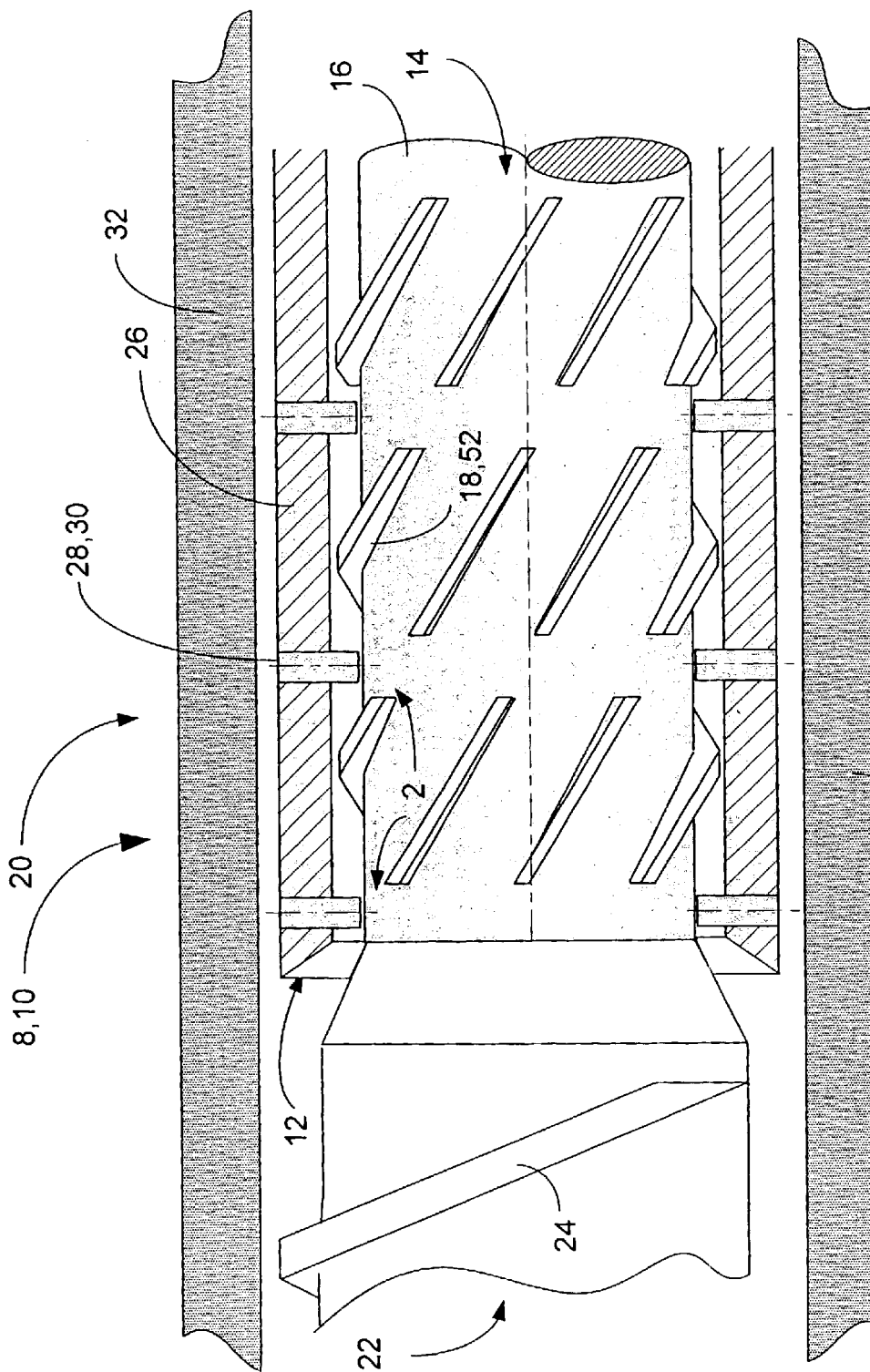
FIG. 1 shows a side cut away view of a mixing section of a screw extruder of the present invention.

The purposes and advantages of the present invention will be apparent from the following detailed description in conjunction with the appended drawings in which FIG. 1 shows a mixer 10 of the present invention in use with a screw extruder 8. In a screw extruder 8, a central screw 14 includes a central shaft 16 having a number of protruding mixing elements 18 which are configured into a mixing section 20. It is to be understood that there may be, and preferably are, other sections included on the screw 14 which are concerned primarily with conveying materials, and one such conveying section 22 is shown having conveying flights 24. The mixing section 20 portion of the central screw 14 is surrounded by the sleeve 12, which has a sleeve body 26 and protruding mixing elements 28 which preferably face inward towards the central screw 14. The protruding mixing elements 18, 28 on both the screw 14 and the sleeve are intermeshed with each other in radial patterns such that the relative movement of the screw 14 compared to the sleeve 12 results in no collisions. The mixer 20 is configured such that a circumferential ring of mixing elements 18 on the screw 14 neighbors a circumferential ring of mixing elements 28 on the sleeve 12. The mixer 20 contains several rings of mixing elements 18, 28 to provide excellent mixing performance. The shape of the mixing elements 18, 28 can be circular, but they can also have many different shapes, e.g. ellipsoidal, square, diamond shaped, triangular, etc. The mixing elements 18, 28 are preferably arranged in a circumferential direction, however, other patterns can be used as well.

Preferably, the screw 14 has helical flights 52 as a form of protruding mixing element 18 so that the mixing section 20 can achieve forward pumping action. This can be advantageous in cases where the pressure drop in the mixing section has to be minimized. Preferably, the protruding mixing elements 28 on the sleeve 12 are cylindrical pins 30. The helical flights 52 and the pins 30 are intermeshed so that they do not interfere with each other, and so that they also provide many regions of reorientation 2 for mixing the material.

It is possible to have helical flights 52 in the barrel 32 or sleeve 12 as well. This serves to emphasize that the protruding mixing elements 18, 28 in the screw 16 and sleeve 14 do not need to be pins 30, and may in fact be any of a number of configurations and shapes as long as they intermesh to create multiple regions of reorientation in the mixing section.

The sleeve 12 and the screw 14 are both surrounded by a barrel 32 which serves to contain the material and which interacts to also mix the material to some degree. The sleeve 12 "floats" between the root of the screw 14 and the barrel 32 where normally the clearance between the sleeve and the barrel will be quite small. The clearance between the sleeve 12 and the screw 14 will be relatively large because the mixing elements 28 on the ID of the sleeve 12 protrude radially inward for a considerable distance while mixing elements 18 on the screw 14 protrude radially outward for about the same distance. The radial gap between the sleeve 12 and the screw 14 has to be large enough to allow the flow of polymer melt through this annular region without excessive pressure drop. In cases where the annular space between the screw and barrel is limited it is possible to increase the barrel ID locally to allow more space for the mixing sleeve. It is also possible to design a pocket in the barrel such that the solid part of the sleeve fits entirely in the pocket.

As referred to above, the sleeve 12 preferably "floats" within the barrel 32, or in other words, it is not driven directly by a drive mechanism. Instead the sleeve 12 is caused to rotate within the barrel 32 by viscous drag forces exerted on the sleeve 12 by the flowing material, which will be rotating in response to the rotation of the screw 14. The speed of rotation of the sleeve 12 will therefore be slower than the rotational speed of the screw 14 due to frictional forces. This gives a configuration of a number of circumferential rings of mixing pins 30 that rotate at different velocities to achieve relative motion between the neighboring rings of pins. The fluid passing through the mixer 20 is reoriented each time it passes from one ring of pins 18, 28 to the next, thus creating multiple regions of reorientation 2 that are very effective in distributive mixing of the material.

Reorientation involves changing the orientation of the interfaces of the components of a mixture. Interfaces tend to orient in the direction of flow and this reduces the effectiveness of mixing. The most efficient mixing occurs when the interfaces are oriented perpendicular to the flow direction. Therefore, reorientation can greatly improve the effectiveness of mixing.

It is well known from distributive mixing theory that the mixing efficiency increases proportional to the shear strain; however, it increases exponentially when the fluid interfaces are reoriented during the mixing process. Since each transition from one ring of pins 18, 28 to the next achieves a reorientation of the fluid it is possible to achieve multiple reorientation events by having multiple rings along the length of the mixer 10.

Figure 2:
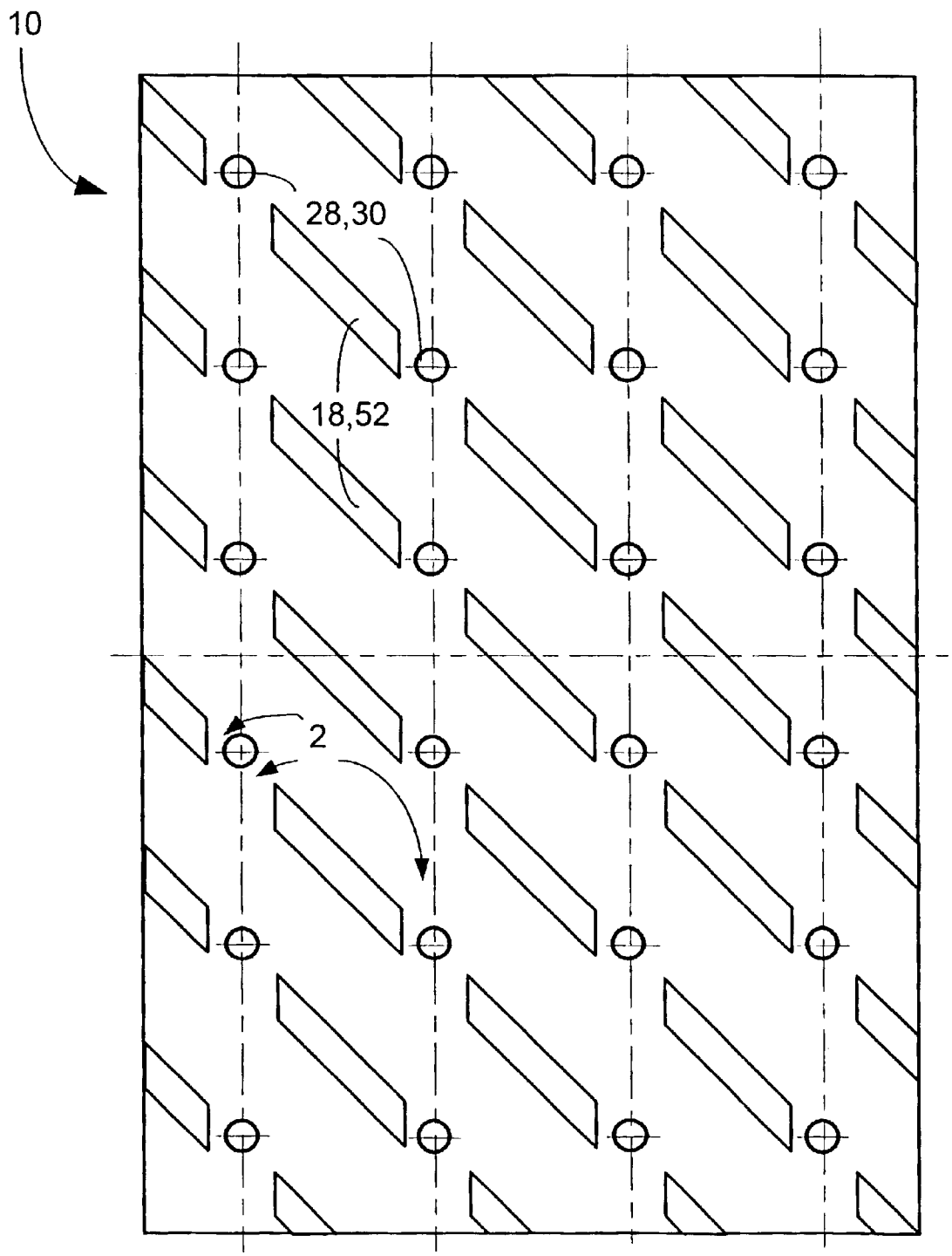
FIG. 2 shows an unrolled view of a mixing section of a screw extruder of the present invention.
Figure 3:
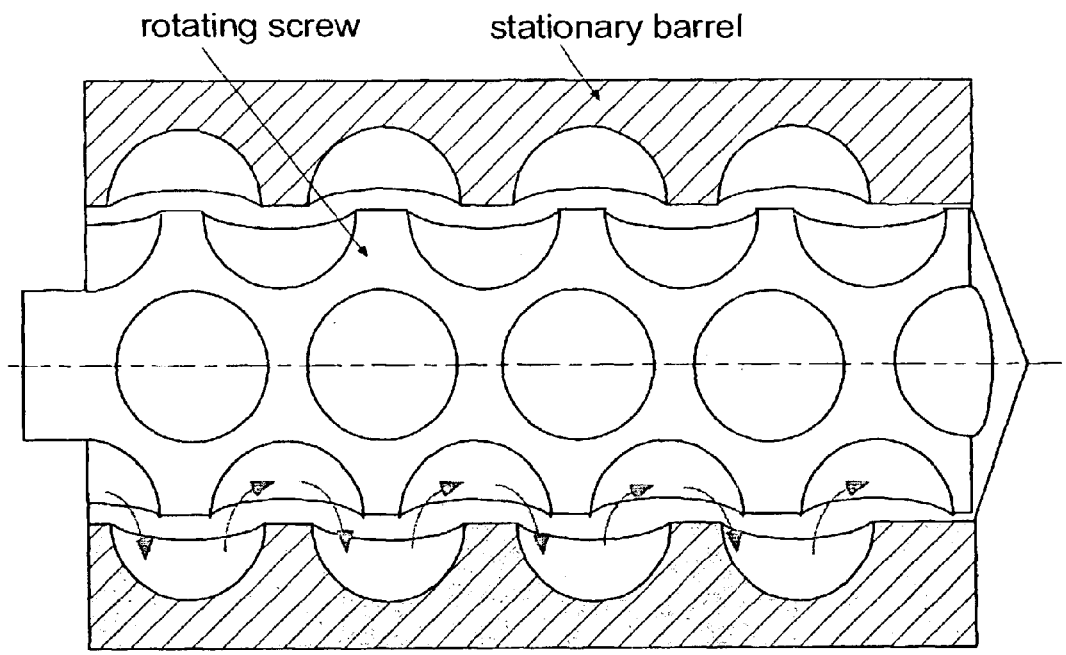
FIG. 3 shows a side cut-away view of a cavity transfer mixer of the prior art.

FIG. 2 shows an "unrolled" view of the mixing section 10. In this view, the positions of both the helical flights 52, which are the mixing elements 18 on the screw shaft, and the pins 30, which are the preferred mixing elements of the sleeve 12, are shown. The multiple regions of reorientation 2 are indicated. It will be appreciated how many regions of reorientation are thus established, and thus how effective is the distributive mixing of the present invention 10.

FIGS. 3–6 show various mixing sections of the prior art, which are discussed above.

Figure 8:
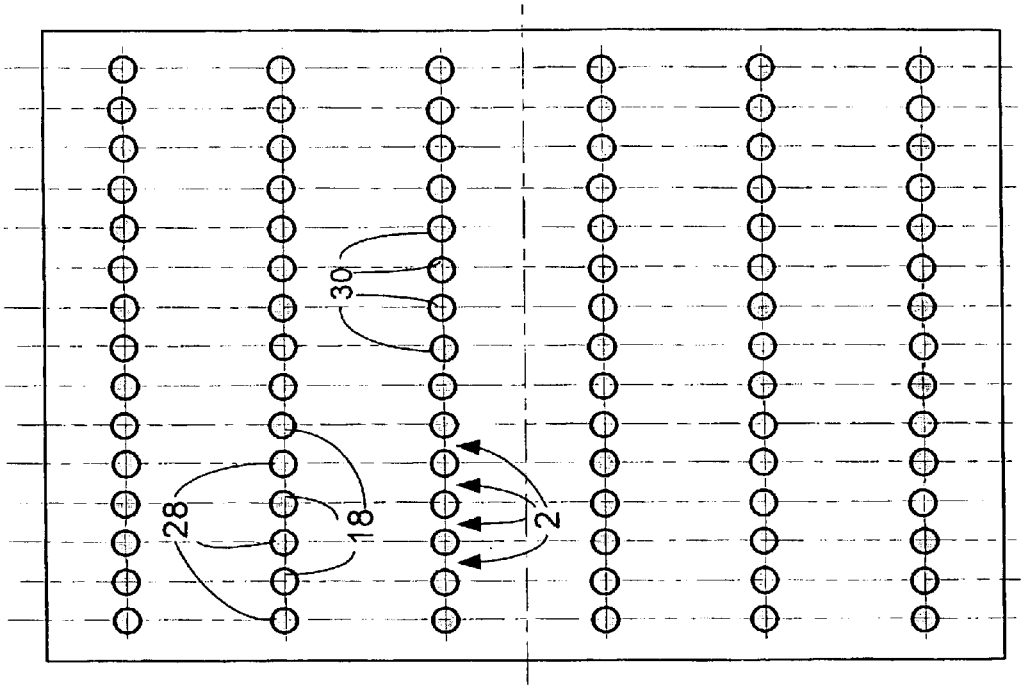
FIG. 8 shows an unrolled view of a mixing section of the present invention using pins as the mixing elements.
Figure 7:
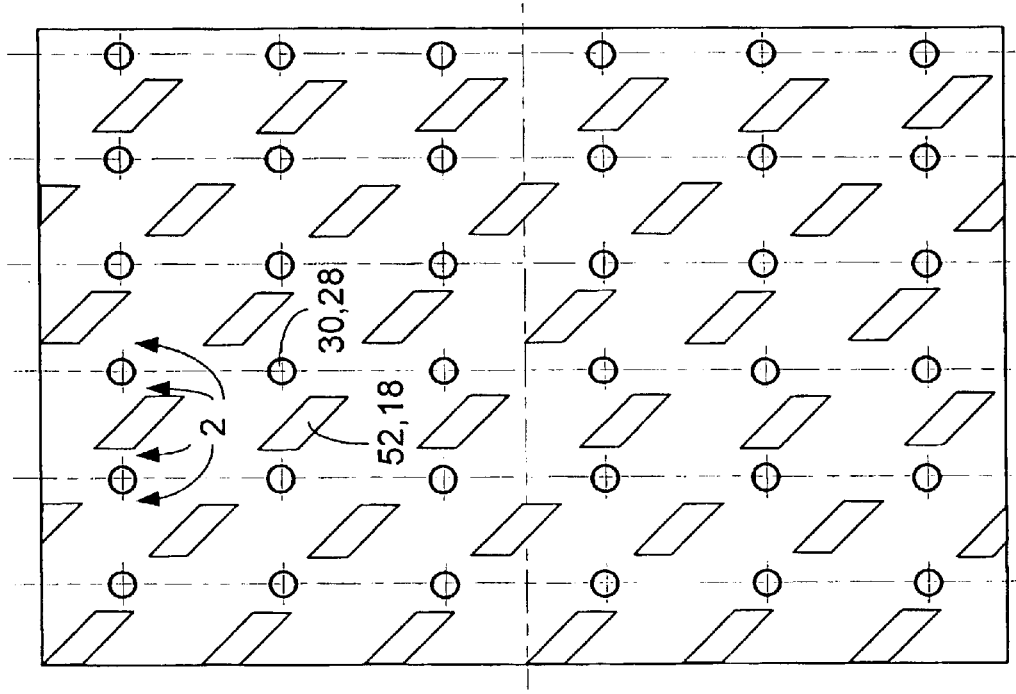
FIG. 7 shows an unrolled view of a mixing section of the present invention using shortened helical flights as mixing elements.

FIGS. 7–8 show addition unrolled views of variations in the mixing sections 20 of the present invention 10. In FIG. 7, the helical flights 52, which are the mixing elements 18 on the screw shaft, are shorter in length than previously shown, and the pins 30, which are the preferred mixing elements of the sleeve 12, are closer together. The multiple regions of reorientation 2 are also closer together, and thus more are available per length unit of mixing section 20 than in the previous embodiment.

As this trend continues, the helical flights come closer and closer to being diamond shaped, as all four sides may be equal in length. Also as this trend continues, the conveying properties provided by the previous helical flights have been reduced. Forward conveyance is now traded for an emphasis on providing a large number of regions of reorientation per unit length. The shape of the mixing elements on the screw shaft is now freed to take other shapes, one of which is that of a cylindrical pin, so that in FIG. 8, the unrolled view shows rows of pins 30 which alternate between rows of mixing elements 18 from the screw shaft and mixing elements 28 from the sleeve. This results in a very dense configuration of regions of reorientation 2, which can be expected to produce very high quality distributive mixing. It should be obvious that many other shapes can be used such as square, rhomboidal, hexagonal, etc.

Figures 9, 10:
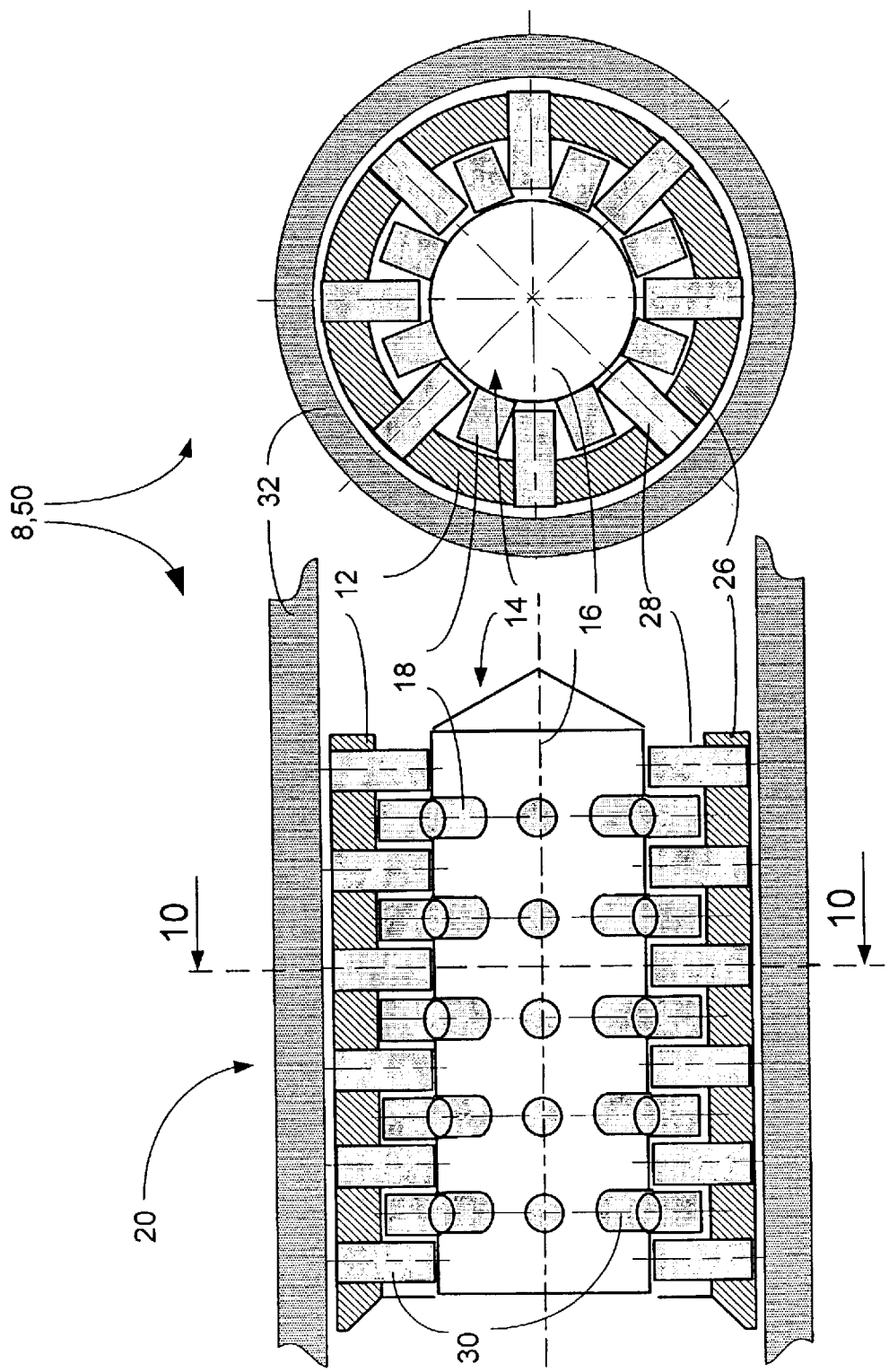
FIG. 9 shows a side cut-away view of the mixer of the present invention using pins as the mixing elements.
FIG. 10 shows a cross-sectional view of the mixer of the present invention using pins as the mixing elements as taken through line 10—10 of FIG. 9.

FIG. 9 shows a side cut-away view and FIG. 10 shows a cross-sectional view as taken through line 10—10 of FIG. 9, of an embodiment 50 of mixer with intermeshing pins on both the central screw 14 and the sleeve 12. As before, the screw extruder 8, has a central screw 14 includes a central shaft 16 having a number of protruding mixing elements 18 which are configured into a mixing section 20. The mixing section 20 portion of the central screw 14 is surrounded by the sleeve 12, which has a sleeve body 26 and protruding mixing elements 28. The mixer 20 is configured such that a circumferential ring of mixing elements 18 on the screw 14 neighbors a circumferential ring of mixing elements 28 on the sleeve 12. The mixer 20 contains several rings of mixing elements 18, 28 to provide excellent mixing performance. As before, the shape of the mixing elements 18, 28 can be circular but it can have many different shapes, and are preferably arranged in a circumferential direction; however, other patterns can be used as well. Conveying sections are not shown in these views, but it is to be understood that they may be included.

Also as before, the sleeve 12 and the screw 14 are both surrounded by a barrel 32, and the sleeve 12 "floats" between the root of the screw 14 and the barrel 32 where the sleeve 12 is caused to rotate within the barrel 32 by drag forces exerted on the sleeve 12 by the flowing material, which will be rotating in response to the rotation of the screw 14.

Figures 11, 12:
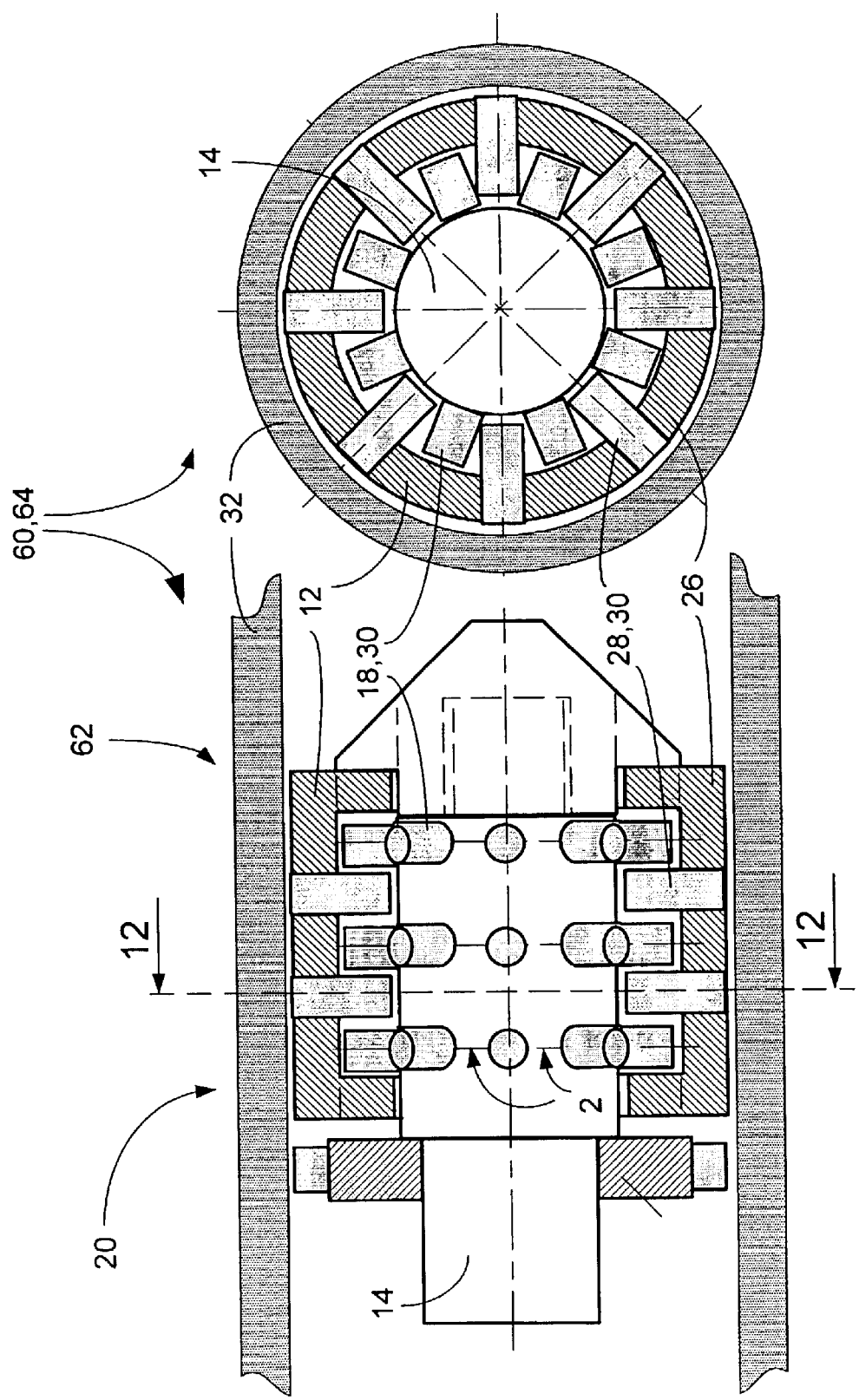
FIG. 11 shows a side cut-away view of the mixer of the present invention used as a non-return valve in an Injection Molding Machine.
FIG. 12 shows a cross-sectional view of the mixer of the present invention used as a non-return valve in an Injection Molding Machine as taken through line 12—12 of FIG. 11.

FIG. 11 shows a side cut-away view and FIG. 12 shows a cross-sectional view as taken through line 12—12 of FIG. 1, of another embodiment 60 of the mixer, where it is included in a non-return valve 62 used as a mixing section 20 in the plasticating unit of an injection molding machine 64. The sleeve 12 of the non-return valve 62 can move axially relative to the screw 14 inside the barrel 32 and as a result, portions of the sleeve body 26 can provide a shutoff action when the sleeve 12 is in the most rearward position. As before, the sleeve 12 is allowed to float and intermeshing mixing elements 18, 28 on the screw 14 and sleeve 12 create multiple regions of material reorientation 2 that provide improved mixing. It is expected that this axial movement will require that the mixing elements, in this case pins 30, to be spaced slightly farther apart than in the extruder versions discussed above. The mixing elements 18 on the screw 14 may also be helical flights if additional forward conveyance of material is desirable.

It is important to note that the present mixer can be used not only in single screw extruders and in the plasticating unit of injection molding machines; it can also be used in multi-screw extruders and mixing devices. It can be used in continuous mixers as well as batch mixers. In normal applications the easiest location of the present mixer will be at the very end of the screw. However, it is possible to locate the mixer further upstream by either making the screw with detachable sections or by making the sleeve of the mixer split so that it can be installed over a particular section of the screw.

The mixer 10 of the present invention makes it possible for a simple single screw extruder to achieve the mixing action of a pin barrel extruder. This mixing action is actually better than the mixing action in a typical twin screw compounding extruder. This opens up very interesting possibilities because it allows the manufacture of single screw extruders with mixing capability better than twin screw extruders at prices only slightly higher than conventional single screw extruders.

A great advantage of the present invention is that the screw and floating sleeve can be inserted into the barrels of existing extruders and injection molding machines without the necessity to extensively rework the machines. Thus it is simple to retrofit these machines to include the mixing section of the present invention. It is even possible that a machine can be "convertible", meaning that the screw and sleeve can be again removed to convert the machine to a standard configuration. It is expected that manufacturing costs will be reduced for a sleeve and screw that can be fabricated external to the barrel and then inserted, as opposed to attempting to install permanent pins in the interior wall of the barrel and then thread the screw into place. The present mixer 10 has a simple geometry and, as a result, it can be manufactured easily.

Initial results from testing on an injection molding machine confirm that the mixing action of the mixer 10 is very efficient and that the multiple reorientation events can achieve very good mixing quality in a mixer 10 with a rather short axial length. The mixer 10 in the tests was incorporated into a non-return valve with an axial length of only about one diameter. In extrusion applications mixers are usually 2D–3D long. As a result, it is likely that mixing can be improved in extrusion even more significantly than in injection molding.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present screw extruder 10 is well suited generally for application in any mixing process where a solid or liquid or gaseous ingredient needs to be mixed in a viscous fluid. This may be the mixing of solid agglomerates in a viscous fluid or the mixing of liquid droplets in a viscous fluid. It is particularly well suited for use in mixing blends of polymers or for mixing additives to polymers prior to extrusion forming.

Applications in the polymer field include the dispersion of solid pigments into polymers for making colored plastic products. Particularly where uniformity of color is important, it is very advantageous that the color particles are well dispersed and that the color particles are uniformly distributed in the polymer matrix by efficient distributive mixing.

The present invention 10 can also be used to improve the dispersion of incompatible polymer components into a polymer matrix to produce polymer blends and alloys. Good mixing can be important in obtaining uniform material properties such as tensile strength, durability, etc. Reinforcing fillers can be added to a polymer matrix to produce increased stiffness with greater uniformity using the present invention 10.

When manufacturing conductive or semi-conductive materials, the mixing of conductive fillers in a polymer matrix is enhanced by use of the present invention 10. The mixing of magnetic fillers in plastic magnets, and mixing of solid fillers for increased resistance to oxidation can both be improved when using the improved mixer 10. The present invention 10 is also useful in the manufacture of rubber adhesives.

The viscous fluid to be mixed does not have to be plastic or polymer based. It is possible to mix food products such as dough, mashed potatoes, cooking oil, a slurry of grapes or fruit concentrates, honey or peanut butter. It can also be petroleum products like oil or rocket fuel, etc. All of these materials may benefit from the improved mixing which is provided by the present invention 10.

Another consideration which makes improved mixing desirable, is that the variation in melt temperature is reduced by better mixing. A desired level of thermal homogeneity can be achieved over a shorter length. This allows more compact and efficient extruders to be designed. Factory floor space could be reduced at great savings. Also, as the mixing is improved, the throughput of the extruder 8 can be increased while maintained extrudate quality, resulting in an increase in overall efficiency, with attendant cost savings.

The mixer 10 of the present invention provides improved mixing by a configuration of intermeshing mixing elements 18, 28 that produce multiple regions of re-orientation 2. It is well known from distributive mixing theory that the mixing efficiency increases proportionally to the shear strain; however, it increases exponentially when the fluid interfaces are reoriented during the mixing process. Reoriented means that the orientation of the interfaces has changes from its natural orientation. The natural orientation of the interfaces is in the direction of flow; however, this is the least favorable orientation for mixing.

The sleeve 12 preferably "floats" within the barrel 32, and is caused to rotate within the barrel 32 by drag forces exerted on the sleeve 12 by the flowing material, which will be rotating in response to the rotation of the screw 14. The speed of rotation of the sleeve 12 will therefore be slower than the rotational speed of the screw 14 due to frictional forces. This gives a configuration of a number of circumferential rings of mixing pins 30 that rotate at different velocities to achieve relative motion between the neighboring rings of pins. Since each transition from one ring of pins 18, 28 to the next achieves a reorientation of the fluid it is possible to achieve multiple reorientation events by having multiple rings or regions of reorientation 2 along the length of the mixer 10. Because there is such a high concentration of re-orientation events in the mixing section 20, the overall length of the mixer 10 can be reduced. The quality of mixing is so high in the present mixer 10 that it rivals or even exceeds that of multiple screw mixers, which are much more expensive, thus providing cost benefits to manufacturers.

The mixing sections 10, 50, 60, which are usable in both screw extruders and injection molding machinery, are simple to manufacture, and are easily retrofitable to many existing types of screw extruder barrels.

Another advantage of the present invention 10 is that material change-over time between runs of materials of different colors or compositions is very fast, meaning that when switching between runs of, say, red plastic and white plastic, there is very little cleaning required. Since the barrel 32 is completely wiped, there is little residue that can contaminate the next run of material. The mixer 10 of the present invention is designed so that the main transfer direction of material is axial, rather than radial, so there is very little pressure drop in the mixing section, thus throughput is very high.

Figure 4:
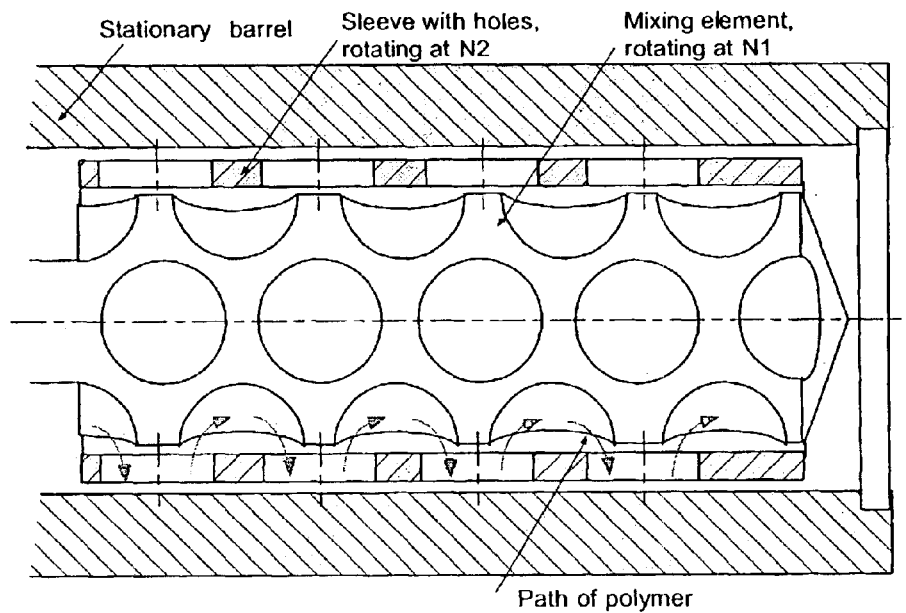
FIG. 4 shows a side cut-away view of a Twente Mixing Ring mixer of the prior art.
Figures 5, 6:
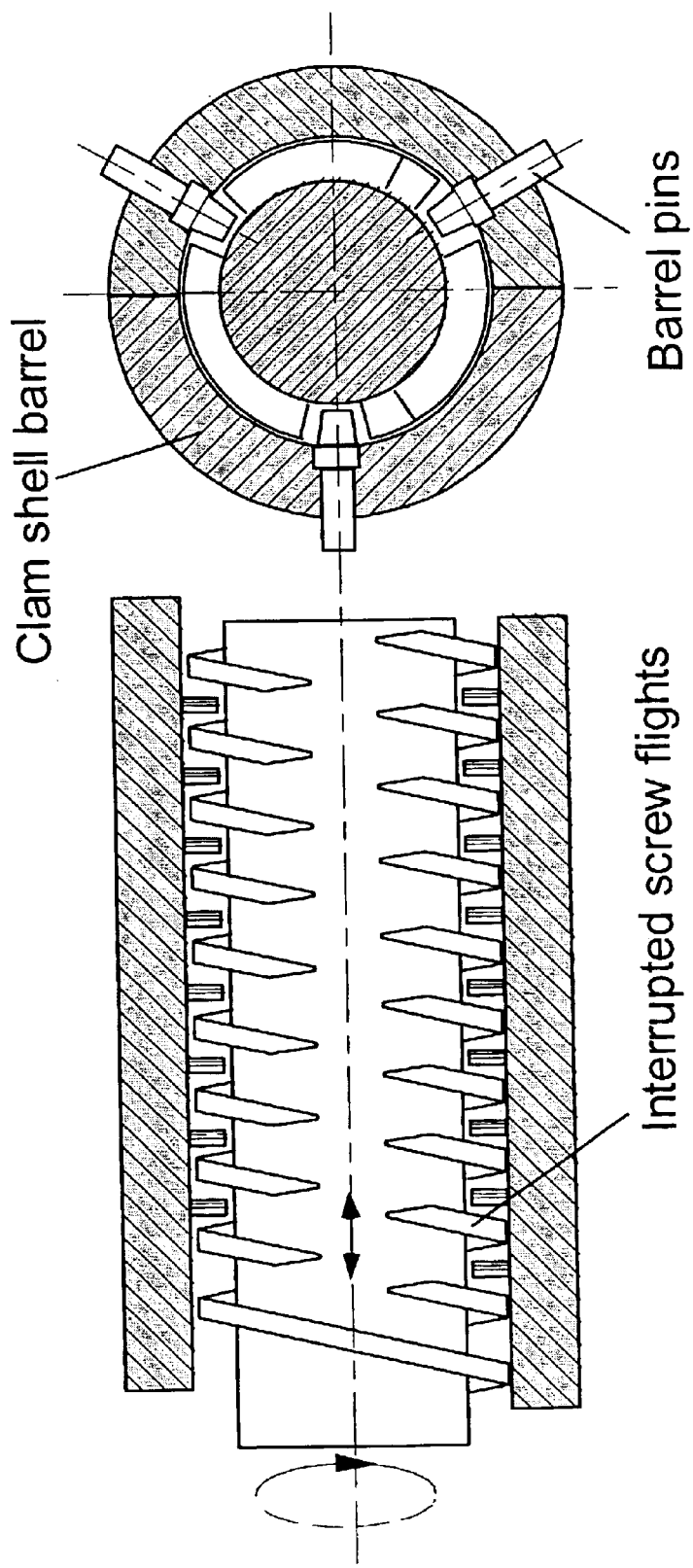
FIG. 5 shows a side cut-away view of a kneader mixer of the prior art.
FIG. 6 shows an end view of a kneader mixer of the prior art.

A comparison of the Twente Mixing Ring (TMR), which is shown in FIG. 4, and the present invention 10 may help to show the industrial advantages of the present invention 10.

In the TMR the reorientation occurs as the fluid passes from a screw cavity to a sleeve cavity and vice versa. In this situation the fluid moves radially and is reoriented by the relative motion between screw and sleeve. In the present invention 10, the reorientation occurs as the fluid passes from one ring with pins to the next. The main flow is axial and the pins divide the flow into annular segments while the reorientation occurs primarily in circumferential direction.

In the TMR there is a forced radial motion; this is not the case in the present invention 10. A substantial benefit of the present invention 10 is that the size of the pins can be substantially smaller than the size of the cavities in the TMR. As a result, the present invention 10 can achieve more interfacial growth in the same physical space than the TMR. This leads to more efficient mixing. Also, the present invention 10 has a large annular channel between the sleeve 12 and the screw 14, which results in low pressure drop. The TMR has a relatively thin annular channel between the sleeve and the screw, which results in relatively high pressure drop.

Table 1 summarizes the differences between the TMR and the present invention 10.

TABLE 1

Comparison of Twente Mixing Ring and Mixer of the Present Invention

| Characteristic | Twente Mixing Ring | The present invention 10 |
| --- | --- | --- |
| Main transfer direction | Radial | Axial |
| Flow in axial direction | Restricted | Unrestricted |
| Pressure drop | High | Low |
| Wiping effect | No | Yes |
| Number of re-orientation events | Medium | High |
| Streamlining | Poor | Good |
| Number of division per cross section | Small | Large |
| Material change-over | Slow | Fast |

As discussed above, the mixer 10 of the present invention makes it possible for a simple single screw extruder to achieve the mixing action of a pin barrel extruder. This mixing action is actually better than the mixing action in a typical twin screw compounding extruder thus allowing the manufacture of single screw extruders with mixing capability better than twin screw extruders at prices only slightly higher than conventional single screw extruders.

A great advantage of the present invention 10 is that the screw 14 and floating sleeve 12 can be inserted into the barrels of existing extruders and injection molding machines without the necessity to extensively rework the machines. Thus it is simple to retrofit these machines to include the mixing section of the present invention. It is even possible that a machine can be "convertible", meaning that the screw and sleeve can be again removed to convert the machine to a standard configuration. It is expected that manufacturing costs will be reduced for a sleeve and screw that can be fabricated external to the barrel and then inserted, as opposed to attempting to install permanent pins in the interior wall of the barrel and then thread the screw into place. The present mixer 10 has a simple geometry and, as a result, it can be manufactured easily.

Initial results from testing on an injection molding machine confirm that the mixing action of the mixer 10 is very efficient and that the multiple reorientation events can achieve very good mixing quality in a mixer 10 with a rather short axial length. The mixer 10 in the tests was incorporated into a non-return valve with an axial length of only about one diameter. In extrusion applications mixers are usually 2D–3D long. As a result, it is likely that mixing can be improved in extrusion even more significantly than in injection molding.

Thus there are many benefits of cost, efficiency and improved performance included in the present invention. For the above, and other, reasons, it is expected that the mixer 10 of the present invention will have widespread industrial applicability. Therefore, it is expected that the commercial utility of the present invention will be extensive and long lasting.

What is claimed is:

1. An extruder comprising:
a barrel;
a screw having a central shaft;
a floating annular sleeve located between said screw and said barrel, and surrounding a portion of said screw, said sleeve having mixing elements protruding radially inward toward said screw; and
said screw including a portion of said central shaft having mixing elements protruding radially outward toward said sleeve, said mixing elements on said screw and said annular sleeve intermeshing to create multiple regions of reorientation in said material to be mixed.

2. The extruder of claim 1, wherein:
said mixing elements on said central shaft are helical flights.

3. The extruder of claim 1, wherein:
said mixing elements on said central shaft are pins.

4. The extruder of claim 1, wherein:
said mixing elements on said sleeve are pins.

5. The extruder of claim 1, wherein:
said central shaft further includes a conveying section having conveying flights.

6. The extruder of claim 1, wherein:
said extruder is the plasticating unit of an injection molding machine.

7. The extruder of claim 6, wherein:
a portion of said screw is a non-return valve.

8. The extruder of claim 1, wherein:
said extruder is a screw extruder.

9. A mixing section for mixing material in an extruder having a barrel, said mixing section comprising:
a screw having a central shaft;
a floating annular sleeve located between said screw and said barrel, and surrounding a portion of said screw, said sleeve having mixing elements protruding radially inward toward said screw; and
said screw including a portion of said central shaft having mixing elements protruding radially outward toward said sleeve, said mixing elements on said screw and said annular sleeve intermeshing to create multiple regions of reorientation in said material to be mixed.

10. The mixing section of claim 9, wherein:
said mixing elements on said central shaft are helical flights.

11. The mixing section of claim 9, wherein:
said mixing elements on said central shaft are pins.

12. The mixing section of claim 9, wherein:
said mixing elements on said sleeve are pins.

13. A mixer for mixing material in an extruder having a barrel, said mixer comprising:
a screw having a central shaft, a portion of said central shaft having mixing elements protruding radially outward; and
a sleeve located coaxial to and floating between said screw and said barrel, said sleeve having mixing elements protruding radially inward toward said screw; where said sleeve rotates with said screw due to the viscous forces in said material acting on the sleeve, and where the rotational speed of said sleeve is lower than the rotational speed of the screw, said mixing elements on said screw and said annular sleeve intermeshing, thus creating multiple regions of reorientation.

14. The mixer of claim 13, wherein:
said mixing elements on said central shaft are helical flights.

15. The mixer of claim 13, wherein:
said mixing elements on said central shaft are pins.

16. The mixer of claim 13, wherein:
said mixing elements on said sleeve are pins.

* * * * *